Figure 1:
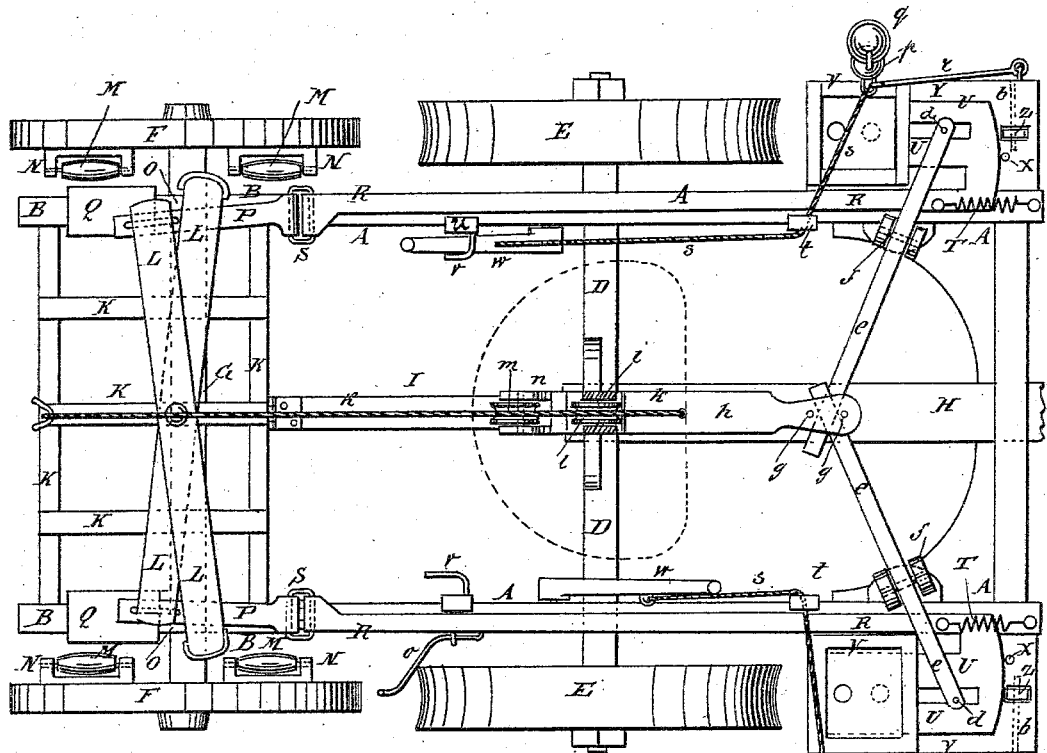

(No Model.)  S. E. WILLIAMS.  3 Sheets—Sheet 1.

CHECK ROW CORN PLANTER.

No. 305,874. Patented Sept. 30, 1884.

WITNESSES:  INVENTOR:

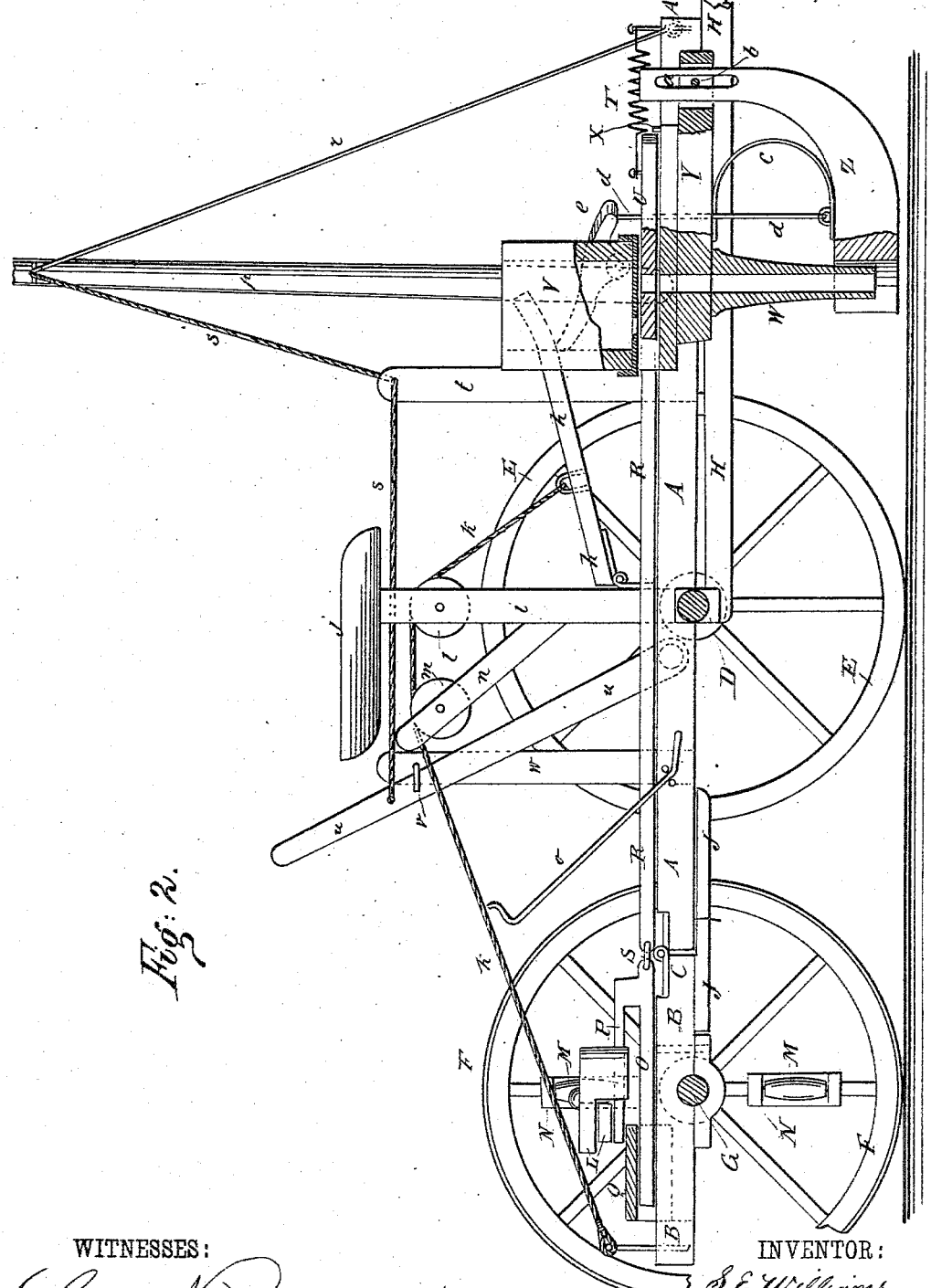

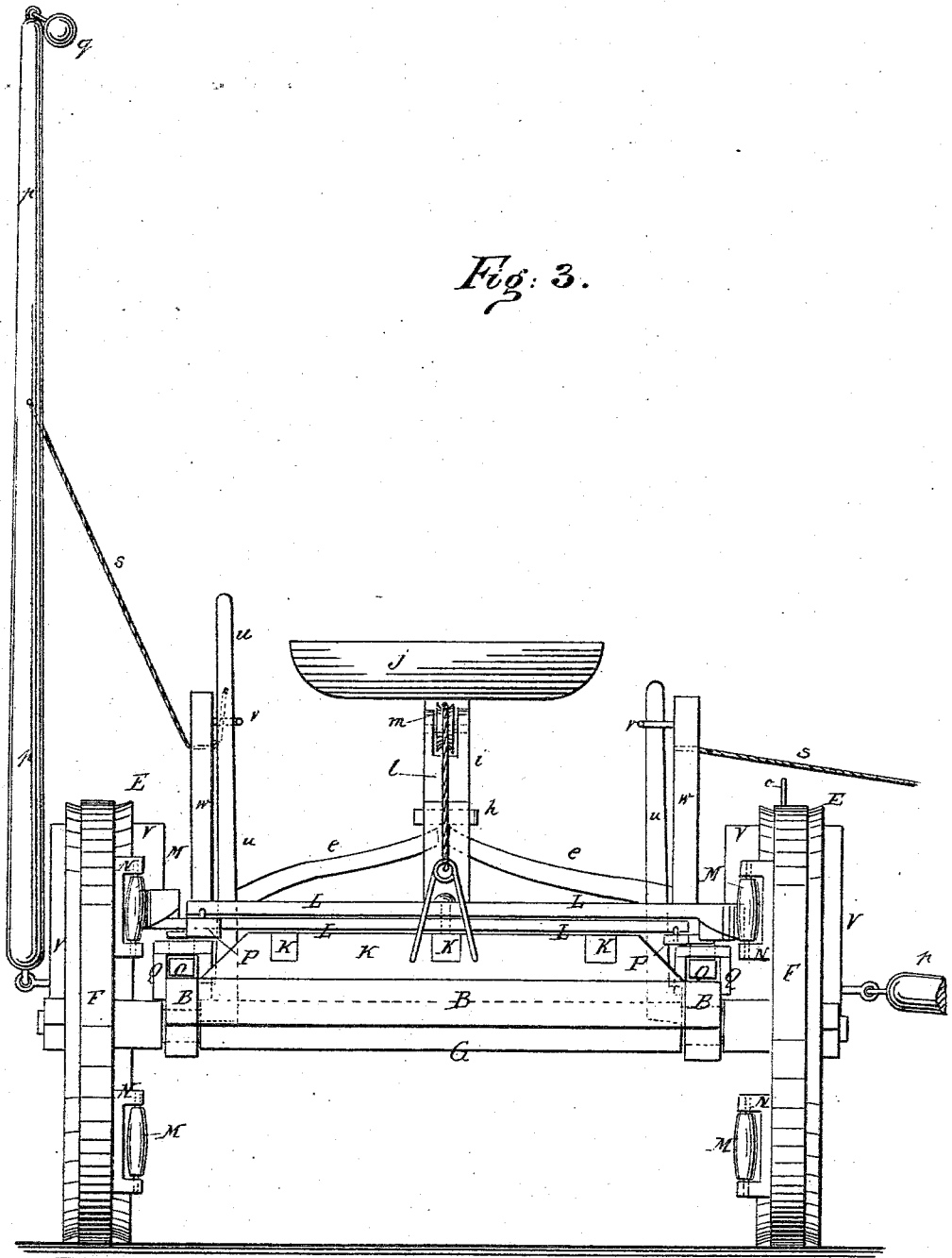

UNITED STATES PATENT OFFICE.

STEPHEN E. WILLIAMS, OF ROCKPORT, MISSOURI, ASSIGNOR TO HIMSELF, AND JOSEPH C. UTTER, OF TREMPEALEAU, WISCONSIN.

CHECK-ROW CORN-PLANTER.

SPECIFICATION forming part of Letters Patent No. 305,874, dated September 30, 1884.

Application filed April 16, 1884. (No model.)

*To all whom it may concern:*

Be it known that I, STEPHEN E. WILLIAMS, of Rockport, in the county of Atchison and State of Missouri, have invented certain new and useful Improvements in Check-Row Corn-Planters, of which the following is a full, clear, and exact description.

Reference is to be had to the accompanying drawings, forming part of this specification, in which similar letters of reference indicate corresponding parts in all the figures.

Figure 1, Sheet 1, is a plan view of my improvement. Fig. 2, Sheet 2, is a side elevation of the same, partly in section. Fig. 3, Sheet 3, is a rear elevation of the same.

The object of this invention is to facilitate the planting of corn in accurate check-rows, and also to promote convenience in controlling such planters.

The invention consists in a check-row corn-planter constructed with a frame mounted upon a stationary axle and rotating wheels, and having hinged to it a frame provided with a rotating axle and fixed drive-wheels, so that the said drive-wheels can be raised from the ground. The drive-wheels are provided with rollers to act upon levers pivoted to the hinged frame, and connected with hinged sliding bars attached to the seed-dropping slides, and provided with springs, whereby the said seed-dropping slides will be operated by the revolution of the said drive-wheels. The hinged frame is connected by a rope or chain with a foot-lever hinged to the seat-standard, whereby the drive-wheels can be readily raised from the ground. The runners are slotted, to allow them to be raised, are held down by springs, and are connected by ropes and levers with the foot-lever hinged to the seat-standard, so that the said runners can be readily raised from the ground.

To the stationary frame are hinged marker-bars having metallic balls suspended from their outer ends, held against the draft-strain by hinged braces, and connected by ropes or chains with levers pivoted to the said frame, so that the said markers will be securely held, and can be readily raised and lowered, as will be hereinafter fully described.

The frame of the machine is made in two parts, A B, the side bars of which at their adjacent ends are connected by hinges C. The middle parts of the side bars of the forward frame, A, are rigidly attached to the axle D of the forward wheels, E. The rear wheels, F, are rigidly attached to the axle G, which revolves in bearings attached to the middle parts of the side bars of the rear frame, B. The connection between the forward axle, D, and the forward frame, A, is strengthened by the tongue H, which is attached to the said axle and to the front cross-bar of the said frame A. The tongue H also serves as an indicator in guiding the machine. The connection between the rear frame, B, and the forward axle, D, is strengthened by the bar I, the forward end of which is secured to the said axle, and its rear end is hinged to the forward cross-bar of the said frame B. The hinge-connections between the side bars of the frames A B are strengthened by the bars J, the rear ends of which are attached to the lower sides of the forward ends of the side bars of the frame B, and their forward ends underlap the lower sides of the rear ends of the side bars of the frame A.

To the middle part of the frame B, or to a frame or platform, K, attached to the said frame are pivoted two cross-bars, L, placed one on top of the other. The left-hand end of one bar L and the right-hand end of the other bar project a little beyond the side bars of the frame B, so that the said ends or guard blocks or caps attached to the said ends will be struck and operated by rollers M, pivoted to supports N, attached to the spokes of the wheels F, near the rims of the said wheels. The wheels F are made of a circumference equal to twice the required distance apart of adjacent hills, and two rollers at equal distance apart are attached to each wheel F, so that the bars L will be operated twice at each revolution of the said wheels. When the seed is to be planted in drills, more than two rollers M are attached to each wheel F, so that the bars L will be operated oftener than twice at each revolution of the wheels F. The other or shorter ends of the bars L are connected with the bars O or with arms P, attached at their forward ends to the forward parts of the said bars O. The rear parts of the bars O slide in guide-sockets Q, attached to the side bars of the frame B, and their forward ends are connected with the rear ends of the bars R by hinges S, placed directly over the hinges C, so that the bars O R, when in their normal position, will not interfere with the movement of the frame B upon the frame A. The bars O R, when the bars L are released from the rollers M, are drawn forward into their normal position by springs T, connected with their forward ends, and attached to the frame A. The forward movement of the bars L is limited by pins X or other stops attached to the frame A. The forward ends of the bars R are connected with seed-dropping slides U, which enter the lower parts of the seed-boxes V and convey the seed to the spouts W, through which it passes to the ground. The seed-boxes V are secured to supports Y, attached to the side bars of the frame A, and to the lower sides of which are attached the upper ends of the conducting-spouts W. The lower ends of the spouts W enter the upper parts of the openings in the forked rear ends of the channel-opening runners Z. The forward ends of the runners Z are curved upward, pass through slots in the forward parts of the supports Y, and have vertical slots $a$ formed in them to receive pins $b$, attached to the supports Y to limit the up and down movements of the said runners. The runners Z are held down with sufficient force to cause them to open a channel to receive the seed by springs $c$, interposed between the said runners and the supports Y, as shown in Fig. 2.

To the upper sides of the runners Z are attached the lower ends of cords, chains, or rods $d$, which pass up through slots in the supports Y and seed-dropping slides U, and are attached at their upper ends to the outer ends of the levers $e$. The levers $e$ are fulcrumed to supports $f$, attached to the side bars of the frame A. The inner ends of the levers $e$ pass through a keeper, $g$, attached to the lower side of the forward end of the lever $h$, which is hinged at its rear end to the forward side of the standard $i$. The lower end of the standard $i$ is attached to the center of the forward axle, D, and to its upper end is attached the driver's seat $j$.

To the lever $h$, at the distance of about one-third its length from the seat-standard $i$, is attached the end of a rope or chain, $k$, which passes over a pulley, $l$, pivoted in a slot in the seat-standard $i$, and over a pulley, $m$, pivoted to the slotted upper end of the rearwardly-inclined arm $n$, rigidly attached at its lower end to the lower part of the said seat-standard $i$. The rear end of the rope or chain $k$ is secured to the rear cross-bar of the frame B by a staple, or other suitable means. By this construction, by depressing the forward end of the foot-lever $h$, the runners Z and the wheels F will be raised from the ground, so that the machine can be readily turned, and drawn from place to place, without marking the ground or operating the seed-dropping mechanism. As the frame B and wheels F are raised from the ground, the motion of the wheels is at once checked by the brake-arm $o$, attached to a side bar of the frame A, and against which one of the said wheels F or the axle G strikes.

To the supports Y, at the outer sides of the seed-boxes V, are hinged the inner ends of bars $p$, which are made of a length equal to one and a half times the distance apart of the rows, and from their outer ends are suspended by interlocking-staples, eyebolts, or other suitable means, hollow metallic balls $q$, of such a weight and size as will make such a mark upon the ground as can be easily seen. The marker-bars $p$ are held against the draft-strain by brace-rods $r$, the outer ends of which are hinged to the forward side of the outer parts of the said bars, and their inner ends are hinged to the forward outer corners of the supports Y.

To the outer parts of the marker-bars $p$ are attached the outer ends of the ropes or chains $s$, which pass through guides formed in or attached to the upper ends of the standards $t$. The lower ends of the standards $t$ are attached to the side bars of the frame A, a little at the rear of the seed-boxes V. The rear ends of the cords or chains $s$ are attached to the levers $w$, the lower ends of which are pivoted to the side bars of the frame A, a little at the rear of the forward axle, D, so that the markers can be raised and lowered together or separately by operating the levers $w$. The markers can be held suspended by passing the levers $w$ over the catches $v$, attached to the standards $u$, the lower ends of which are attached to the rear parts of the side bars of the frame A.

Having thus described my invention, what I claim as new, and desire to secure by Letters Patent, is—

1. In a check-row corn-planter, the combination, with the frame A, the stationary axle D, and the loose wheels E, of the hinged frame B, the rotary axle G, and the fixed drive-wheels F, the side bars of said frame B having guides Q to receive the sliding bars R, substantially as herein shown and described, as set forth.

2. In a check-row corn-planter, the combination, with the stationary frame A, the hinged frame B, the fixed drive-wheels F, and the seed-dropping slides U, of the rollers M, the pivoted bars L, the hinged sliding bars O R, and the springs T, said pivoted bars L crossing each other, and with their opposite ends projecting one beyond the other, substantially as herein shown and described, as set forth.

3. In a check-row corn-planter, the combination, with the hinged frame B, and the pivoted runners Z, and the seat-standard $i$, of the rope or chain $k$, the foot-lever $h$, and levers $e$, with their outer forward ends connected to said runners, and their inner rear ends connected to said foot-lever, substantially as herein shown and described, whereby the drive-wheels can be readily raised from the ground, as set forth.

4. In a check-row corn-planter, the combination, with the runners Z, having at their upper ends slots $a$, which receive pins $b$, arranged crosswise of slots of the frame A, which receive said ends of the runners, and the seat-standard $i$, of the springs $c$, the ropes or chains $d$, the levers $e$, and the foot-lever $h$, substantially as herein shown and described, whereby the said runners can be readily raised from the ground, as set forth.

5. In a check-row corn-planter, the combination, with the frame A, of the hinged marker-bar $p$, having suspended ball $q$, the hinged brace $r$, the rope or chain $s$, and the lever $w$, said rope being passed through an apertured standard, $t$, disposed intermediately of said marker-bar and lever, substantially as herein shown and described, whereby the said marker will be securely held, and can be readily raised and lowered, as set forth.

6. The combination, with the seed-slide-operating bars R, of the bifurcated bars O, pivoted or hinged to the latter, and each having one arm sliding in the guide Q of the hinged frame B, and a second arm connected to each of the crossing levers L, actuated by rolls on the driving-wheels, substantially as and for the purpose set forth.

STEPHEN E. WILLIAMS.

Witnesses:
JAMES M. OSBORN,
H. G. WALTNER.